United States Patent [19]

Kilburg

[11] 3,892,299

[45] July 1, 1975

[54] MOBILE ELECTRIFICATION CONDUCTOR SYSTEM

[75] Inventor: Ronald J. Kilburg, Belmont, Calif.

[73] Assignee: The Rucker Company, Oakland, Calif.

[22] Filed: Apr. 19, 1974

[21] Appl. No.: 462,371

[52] U.S. Cl. ........ 191/29 R; 191/29 DM; 191/22 R
[51] Int. Cl. ............................................. B60m 1/34
[58] Field of Search.......... 191/22 R, 22 DM, 23 R, 191/28, 29 R, 29 DM, 30, 31, 33 R, 40, 44, 44.1; 339/22 R, 22 B; 174/68 R, 88 R, 84 B, 88 B, 97, 88 S

[56] References Cited
UNITED STATES PATENTS

| | | | |
|---|---|---|---|
| 3,341,670 | 9/1967 | Martin | 191/44.1 |
| 3,801,751 | 4/1974 | Ross | 191/44.1 |

Primary Examiner—M. Henson Wood, Jr.
Assistant Examiner—D. W. Keen
Attorney, Agent, or Firm—Knobbe, Martens, Olson, Hubbard & Bear

[57] ABSTRACT

Elongated aluminum conductor bars having stainless steel caps for contact surfaces are spliced in end-to-end relation by means of a conductor plate bolted to the upper surfaces of the bars. The bars are extruded with elongated slots formed in the upper surface for receiving the heads of the bolts which clamp the splice plate to the conductor bars. Pins inserted into the ends of grooves extruded in the bars on the corners of the bar surface engaging the steel cap help align the bars.

11 Claims, 6 Drawing Figures

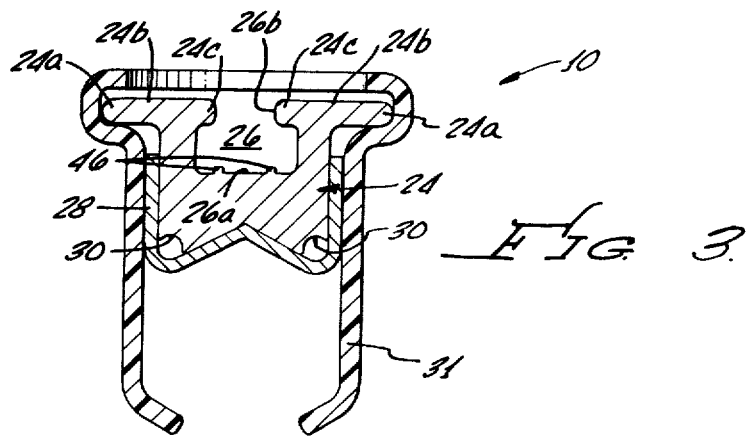
Fig. 3.
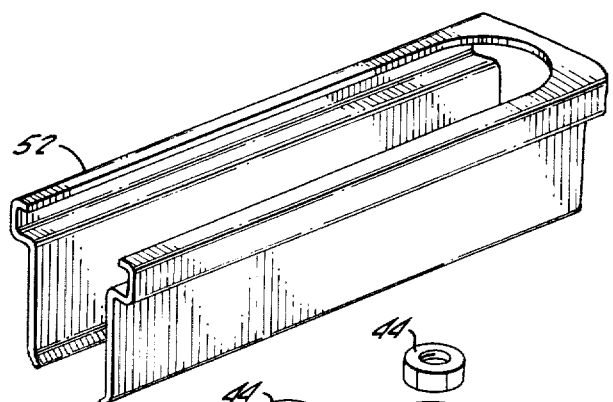
Fig. 4.
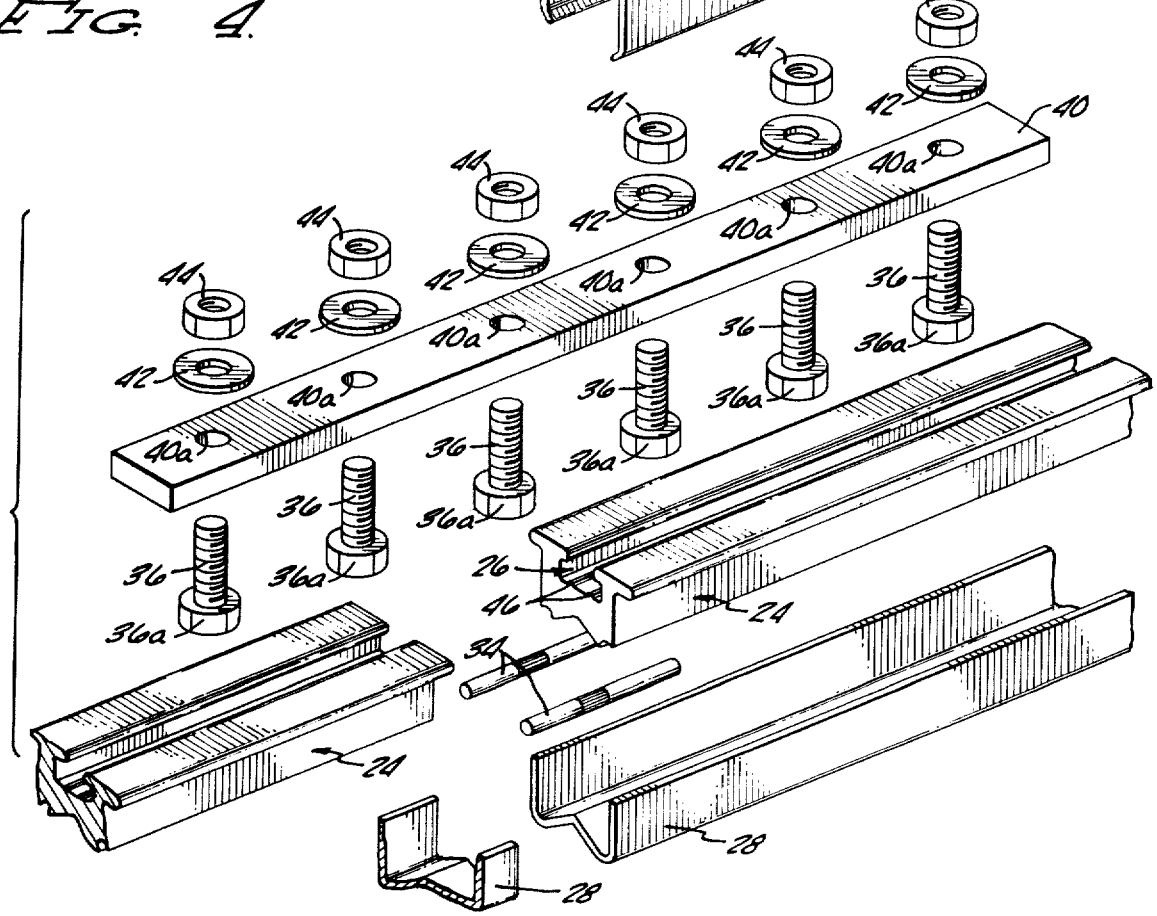

MOBILE ELECTRIFICATION CONDUCTOR SYSTEM

This invention relates to an improved electrical conductor assembly for trolley electrification systems, and more particularly to an improved conductor bar shape and arrangement for splicing lengths of conductor bar.

In recent years there has been renewed interest in the use of electrically powered vehicles for transporting people, especially in high density areas such as airports, zoos, amusement centers and downtown city areas. Typically such systems include multipassenger cars running on concrete guideways with the cars collecting electric power from stationary electrical conductors mounted on the concrete guideway. The guideway is designed as small as practical so as not to interfere with the natural environment. Correspondingly it is desirable that the electrical conductor assemblies be as compact as possible.

One common conductor system utilizes a bar having a modified I-beam shape similar to railroad rails. In such arrangements the sections of the rail are usually spliced by splice plates or splice cables attached to the rail webs. The rails are supported by means of the flanges on one end of the rails. While such arrangements have been quite satisfactory where space is not of particular concern, such rail assemblies do require a considerable cross-section since they are vertically somewhat elongated and yet require the space for the supporting structure at one end of the rail. Also, space must be provided on both sides of the rails to receive collector structure for withdrawing electricity during operation. Thus it is desirable that these space requirements be minimized.

In accordance with the present invention, a conductor is provided which has a compact generally square or rectangular cross-section with an elongated slot formed in its upper surface. Fasteners such as bolts are received in the slots with the straight-sided heads of the bolts being confined by the slots and the shanks of the bolts protruding upwardly through the slots so that they are accessible above the conductor bars. A splice plate overlapping the ends of adjacent conductors is clamped to the upper surfaces of the conductors by nuts threaded onto the bolts. This practical, straight forward approach provides a good electrical and mechanical connection but yet has a low profile so as to enhance the compactness of the system.

The conductor bars are preferably provided with outwardly extending flanges adjacent the upper surface of the bars on opposite sides of the slot. These flanges are convenient for attaching the conductors to a supporting structure. Advantageously the support structure cooperating with the flanges may extend above the bars and be spaced between the spliced joints of the conductors so that splices do not separately add to the height of the structure.

To maintain proper end-to-end alignment of adjacent bars, each of the bars are formed with elongated grooves for receiving alignment pins at the end-to-end joint of the bars. Preferably, the grooves are formed in the corners of the lower or contact surface of the bar, and the actual hole or socket for receiving the alignment pin is partially formed by a cap which fits over the lower surface of the bar to form a contact surface to be engaged by an electrical collector shoe. Such cap is made of electrically conductive materials, such as steel, which wears better than a bar made of aluminum or copper. The alignment pins together with the splice plates form a triangular arrangement that insures good alignment of the bar, which is important for proper operation, particularly at higher collector speeds.

Further features and advantages of the invention will become apparent with reference to the following drawings in which:

FIG. 3 is an end cross-sectional view of the conductor bar with its cap and sheath;

FIG. 4 is an exploded perspective view of the splice construction of the invention;

Figure 1:
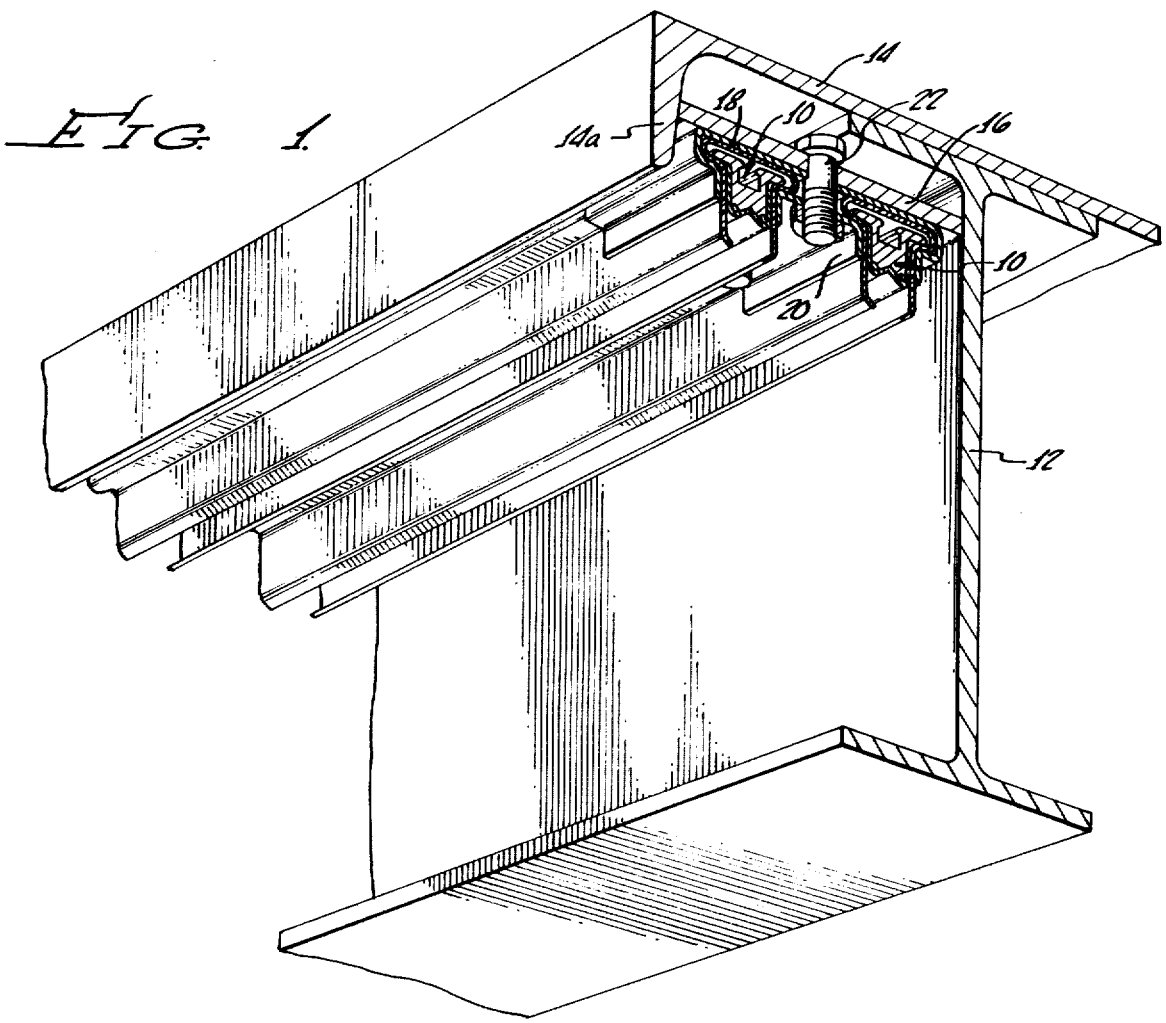
FIG. 1 is a perspective view of the conductor assembly of the invention mounted in its environment.

Referring first to FIG. 1, a pair of conductor assemblies 10 in accordance with the present invention are shown supported in spaced parallel relation adjacent the area where the vehicle or other mobile apparatus to receive the electricity will move. More specifically, there is shown an I-beam 12 supporting a surface plate 14 having a depending flange 14a. Hanger plates 16 extending between the inner surface of the flange 14a and the I-beam 12 are arranged at spaced intervals along the length of the beam 12. Hangers 18 arranged at spaced intervals along the beam 12 enclose the upper ends of the conductor assemblies 10, having edge portions 18a which fit over flanges on the conductor assemblies to support the assemblies, in cooperation with a series of spaced central support elements 20. The elements 20 engage the inner flanges of the conductor assemblies 10 and are attached to the hanger plates 16 by a series of nuts and bolts 22.

Access to the conductor assemblies 10 is had from their undersurface by suitable electrical collectors (not shown). The conductor assemblies 10 may be supported for overhead trolley electrification systems wherein the equipment receiving the electricity would depend from the beam 12. In the arrangement of FIG. 1, the electrical collector (not shown) may be supported from structure riding on top of the plate 14 and includes means extending downwardly adjacent the flange 14a to be available adjacent the conductor assemblies 10.

Figure 2:
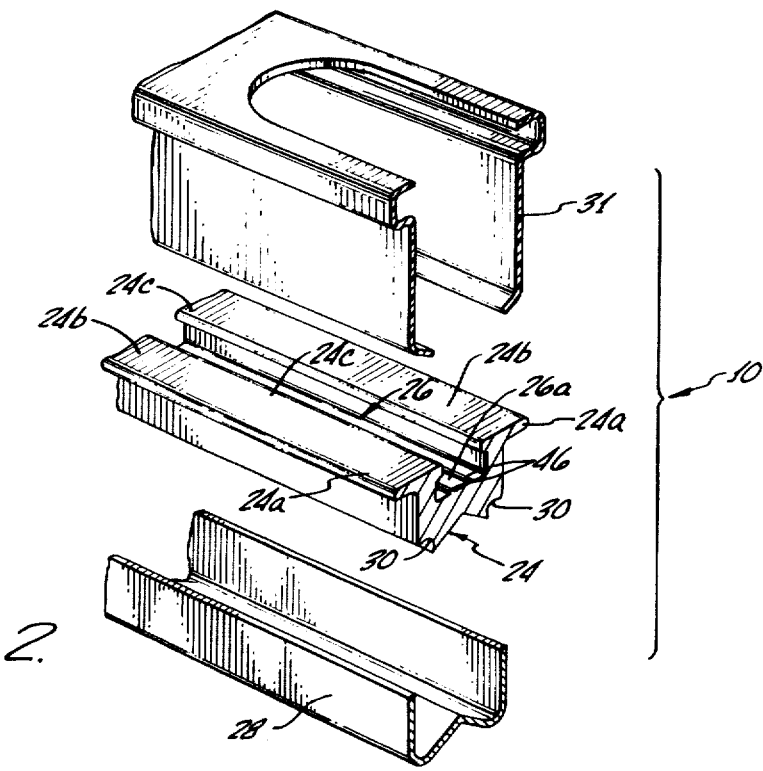
FIG. 2 is an exploded perspective view of the conductor bar, its cap, and its insulating sheath.

Referring now to FIGS. 2 and 3, it may be seen that the conductor assemblies 10 include an elongated extruded conductor bar 24 having a generally square cross-section with two ears or flanges 24a extending outwardly adjacent the upper surface 24b of the conductor bar. Extruded in the upper surface 24b of the conductor bar 24 is an elongated slot or keyway 26 having somewhat of an inverted T-shaped cross-section opening to the upper surface 24b. More specifically, the slot 26 includes a horizontal internal portion 26a which is the head of the T-shape and a narrower vertical portion 26b, which is the leg of the T-shape, that opens to the upper surface 24b of the conductor bar. The inwardly extending flanges or lips 24c define the sides of the vertical portion 26b of the slot 26.

The lower surface 24d of the conductor bar preferably has a shallow V-shaped cross-section which facilitates the centering of a collector shoe. The conductor bar is preferably made of highly electrically conductive metal such as copper or aluminum. A stainless steel cap 28 is positioned over the lower surface 26d and partially onto the side surfaces of the conductor bar 24 to provide a contact or wearing surface for the conductor bar. While steel is not as electrically conductive as aluminum or copper it is much better able to withstand the repeated sliding engagement of the collector shoe. The steel cap 28 is attached to the conductor bar 24 by a suitable means such as punching the exterior side of the cap to form an indentation in the sides of the conductor bar for maintaining the cap in position.

An elongated slot or groove 30 is formed in the lower corners of the conductor bar. Like the slot 26, the slots 30 are conveniently extruded in the bar during fabrication and extend throughout the length of the bar. These grooves 30 form alignment sockets or holes together with the enclosing portions of the cap 28.

Positioned over the conductor bar is an elongated insulating sheath 31 which is formed at its upper end to conform to the conductor and which has side legs extending downwardly considerably below the bottom of the conductor. Such an arrangement minimizes the possibility of electrical shorts in that the collector shoe must extend upwardly within the sheath to engage the contact surface of the cap 28.

In use the conductor bars 24 are extruded in convenient lengths following which conductive grease is applied to the side and lower surfaces and lengths of steel cap are attached to the bar over the grease. The lengths of capped conductor bar are assemblied in end-to-end relation on the use site. It is necessary that the joints between adjacent conductor bars provide both mechanical and electrical connection. FIG. 4 shows the arrangement in accordance with this invention for accomplishing this connection. As can be seen, a pair of alignment pins 34 are positioned in the holes formed by the slots 30 and the adjacent cap 28. These alignment pins extend partially into both of the adjacent conductors and preferably include a knurled midsection to obtain an interference fit with the bars.

Figure 5:
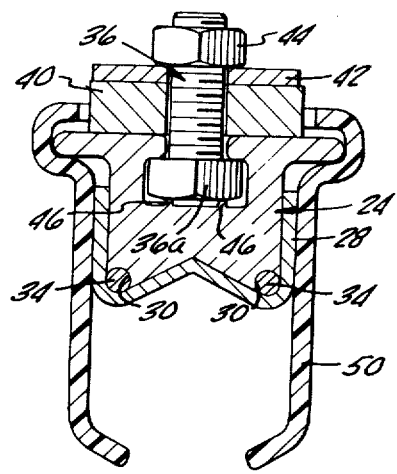
FIG. 5 is a cross-sectional view of the conductor bar through the splice.

A plurality of bolts or other suitable fasteners 36 having straight-sided heads, such as square or hex shaped, are slid into the ends of the slots 26 in the upper surface of the conductor bars 24. As can be seen from FIG. 5, the heads 36a of the bolts 36 fit within the horizontal portion 26a of the slots 26 but are wider than the narrower vertical portion 26b of the slot 26 so that the bolts cannot be moved except along the length of the slot. The bolts shanks 36b are smaller in diameter than the slot portion 26b so that the bolt shanks protrude upwardly through the slots 26b above the upper surface of the conductor bars 24. In the arrangement shown, three bolts are positioned in the end of each conductor bar. A splice plate 40 having a series of predrilled holes 40a for receiving the bolts 36 is positioned on the bolts with its lower surface engaging the upper surface of the conductor bar. Preferably conductive grease is first applied to the splice plate. A series of washers 42 and nuts 44 are utilized to clamp the conductor splice plate 40 in tight engagement with the upper surface of the conductor bars 10. Such an arrangement provides positive electrical and mechanical connection between the adjacent conductor bars.

It is desirable that the bolt head 36a be fairly snugly positioned within the slot portion 26a. To minimize tolerance problems, the upper surface of the slot portion 26a is preferably formed with a pair of elongated narrow ribs 46 which extend upwardly a short distance. If the slot space is slightly too small for a particular bolt head, it is a simple operation to remove a portion of the rib by filing or other such means in order to insert the head of the bolt.

The conductor bars are encased in suitable plastic insulating sheaths which conform to the shape of the bars, it being a simple matter to snap the sheath onto the bars. The ends of the sheaths 31 are formed with a slot or recess 52, as seen in FIG. 4, to accommodate the splice bar 40. An enlarged or swollen plastic sheath 62, of the type shown in FIG. 6, shaped to cover the joint hardware may be provided to protect from accidental contact.

Figure 6:
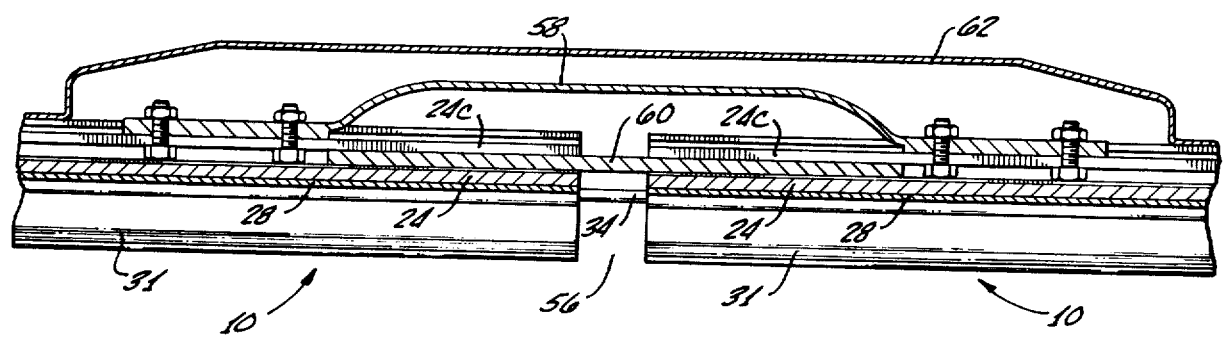
FIG. 6 is a longitudinal cross-sectional view of an expansion joint between two bars.

Instead of using the rigid joints described above at all splices, it is desirable to utilize expansion joints at widely spaced intervals along a series of conductor bars. Such an arrangement is shown in FIG. 6 where an air gap 56 exists between the ends of two adjacent conductor bars to accommodate expansion. A flexible tin plated, copper braided jumper conductor 58 extends between the two conductor bars 24 and is attached to the bars by nuts 44 and bolts 36, with the bolt heads 36a being confined in the slot or keyway of the conductor bar as described in connection with FIGS. 4 and 5. Also bridging the air gap is a short alignment or guide plate 60 having a cross-section to slidingly fit within the elongated slots 26 in the conductor bars. Such a guide plate is not rigidly attached to the conductor bars but serves to maintain the mechanical alignment of the take-off surfaces on the conductor bar caps 28. If desired, alignment pins 34 may also be utilized in the manner described in connection with FIG. 4 so long as they do not prevent relative movement of the two bars.

What is claimed is:

1. An electrical conductor for use in a trolley electrification system comprising:
  an elongated bar having an elongated slot opening to an elongated surface on the bar, said slot being shaped to receive and retain the head of a fastener while the fastener shank extends outwardly through the slot for connection to a splice element; and
  rib means formed along the wall of the slot to engage the head of the fastener to be inserted in the slot, said rib means serving to control the tolerance or fit between the head of the fastener and the slot.

2. An electrical conductor for use in a trolley electrication system comprising:
  an elongated bar having an elongated slot opening to an elongated surface of the bar, said slot being shaped to receive and retain the head of a fastener while the fastener shank extends outwardly through the slot for connection to a splice element, said bar being formed of a good electrically conductive material such as aluminum;
  a cap made of a more wear resistant conductive material such as stainless steel positioned over a portion of said bar to form a contact surface for the bar adapted to engage a sliding conductor on an electrical collector, said slot opening to the surface of the bar opposite from said contact surface; and
  said bar having a pair of elongated grooves formed in the surface of the bar covered by said cap, the grooves being adapted to receive alignment pins for maintaining adjacent conductors in end-to-end alignment.

3. An electrical conductor for use in a trolley electrication system comprising an elongated extruded bar having a generally rectangular cross-section with a lower contact surface for facing a movable collector shoe, an upper surface opposite the lower surface, and a pair of side surfaces adjoining the contact surface, said side surfaces having a pair of flanges extending outwardly beyond the side surfaces and being located adjacent said upper surface for use in mounting the bar, said bar being compact and free of internal voids except for an elongated slot in its upper portion opening to said upper surface for receiving means for electrically and mechanically splicing the bar to an adjacent bar, said bar being made of a material, such as aluminum, which is a good electrical conductor and yet can be economically extruded with said slot and flanges; and a cap made of a material, such as steel, which has electrical conductive properties poorer than that of the bar but wears better than the bar material, said cap fitting over said bar lower surface and onto said side surfaces terminating below the side flanges.

4. The conductor of claim 3 wherein said slot extends throughout the length of the bar and has a generally T-shaped cross-section with the horizontal portion of the T-shape being formed within the bar and the vertical portion of the T-shape opening to the upper surface of the bar.

5. The conductor of claim 3 wherein said bar has a pair of elongated grooves formed on the corners of said contact surface to form with said cap a pair of holes for receiving alignment pins of adjacent bars.

6. An electrical conductor assembly comprising:
a plurality of elongated conductor bars in end-to-end alignment each having an elongated slot formed therein and opening to a surface of the bar, said slot having an enlarged internal portion and a narrower portion opening to said surface of the bar;
a fastener for each of the ends of the bars that are adjacent the end of another bar, said fasteners having a head portion positioned in and retained in the internal portion of each of the slots and having a shank portion extending outwardly through the narrower portion of the slot to be accessible from the exterior of the bar;
a splice plate attached to the fasteners for two adjacent ends of said bars in a manner to secure the plate in tight engagement with the upper surfaces of the bars to form a good electrical and mechanical connection between the bars;
a flexible cable attached to the fasteners for two other adjacent ends of said bars in a manner to form a good electrical connection; and
a rigid splice member slidably positioned in said slots of the adjacent bar ends joined by said cable in a manner to provide mechanical alignment for the bars while permitting expansion and contraction of the bars.

7. The conductor assembly of claim 6 wherein each of said conductor bars has a pair of outwardly extending flanges on opposite sides of the slotted surface for facilitating mounting of the conductor assembly.

8. The conductor assembly of claim 6 wherein said conductor bars have a generally rectangular cross-section with a surface opposite from said slotted surface forming a contact surface for an electrical collector, and means formed in said bar adjacent said contact surface for receiving alignment pins for aligning said bars.

9. The conductor assembly of claim 6 including a cap covering said contact surface for each of the bars and being secured to the side surfaces of the bars, said means for aligning the conductors being grooves formed in the corners of the contact surface which cooperate with said cap to form holes for receiving said alignment pins.

10. The assembly of claim 6 including an insulating sheath fitting closely over said bars but being open at the lower end for access to the bar contact surface.

11. The conductor assembly of claim 10 wherein said bars are extruded of aluminum and have a steel cap secured to the bars covering the bar surface on the sides opposite the sides having the elongated slots, said bars having a pair of elongated grooves formed on the corners of said contact surface to form with said cap a pair of holes for receiving alignment pins of adjacent bars, each of said conductor bars having a pair of outwardly extending flanges on opposite sides of the slotted surface for facilitating mounting of the conductor assembly.

* * * * *